Dec. 22, 1936. M. ROMAINE 2,065,101
BROACHING MACHINE FIXTURE
Filed May 6, 1935  2 Sheets-Sheet 1
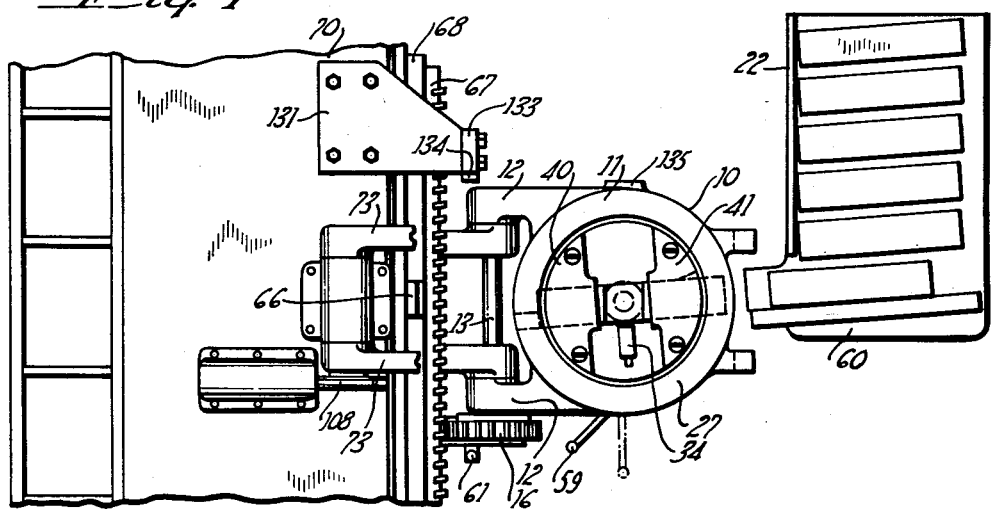
Fig. 1
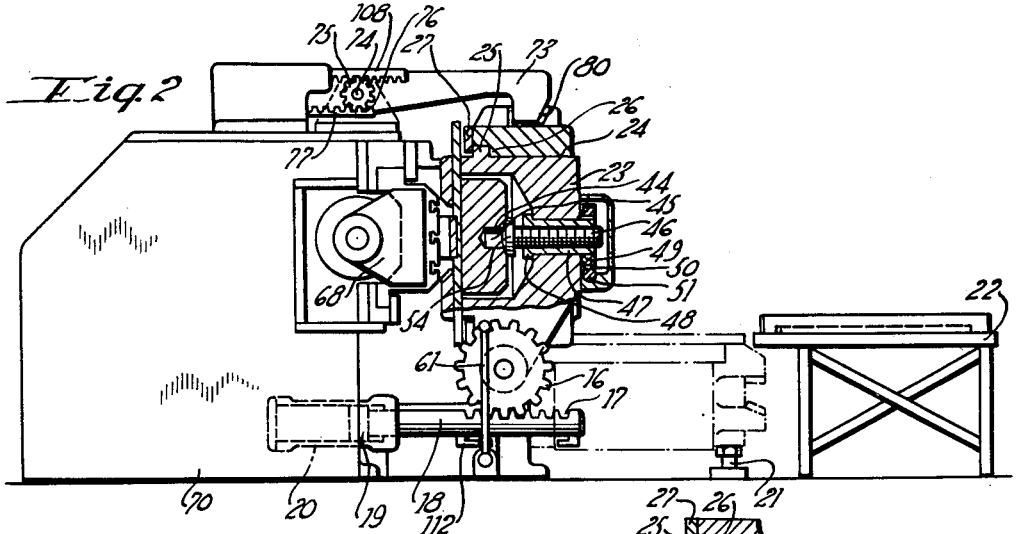
Fig. 2
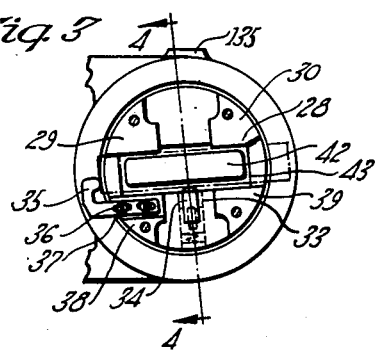
Fig. 3
Fig. 4
INVENTOR.
MILLARD ROMAINE
BY AHK Parsons
ATTORNEY.

Dec. 22, 1936.   M. ROMAINE   2,065,101
BROACHING MACHINE FIXTURE
Filed May 6, 1935   2 Sheets-Sheet 2
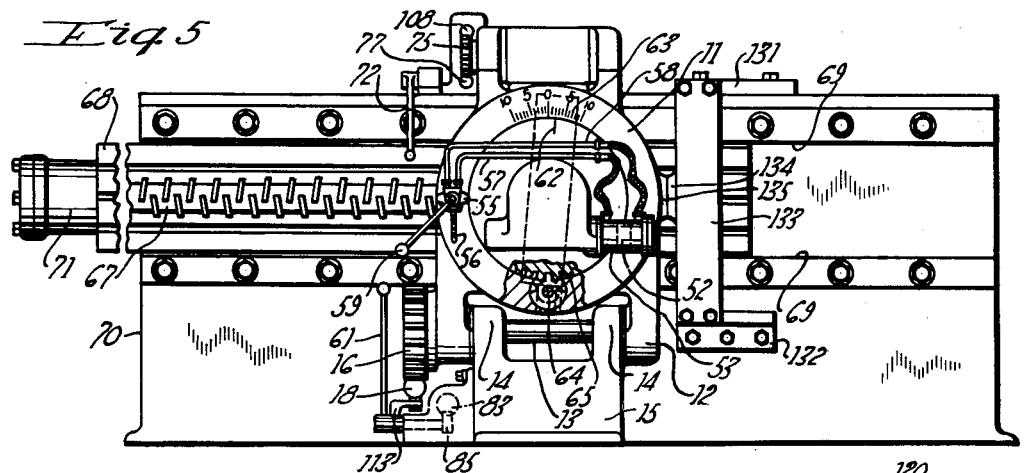
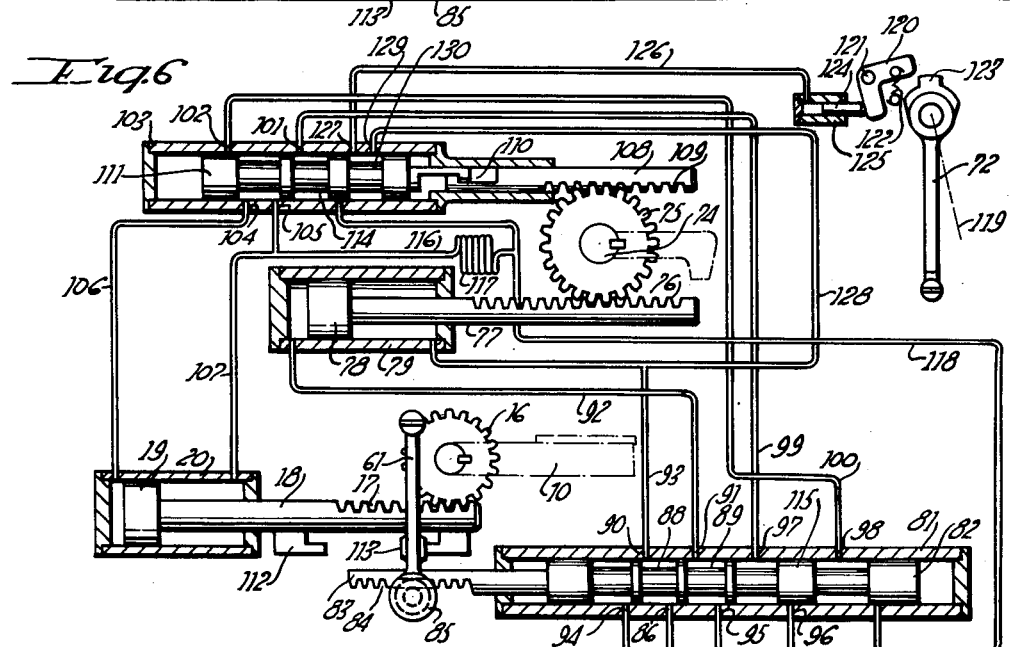
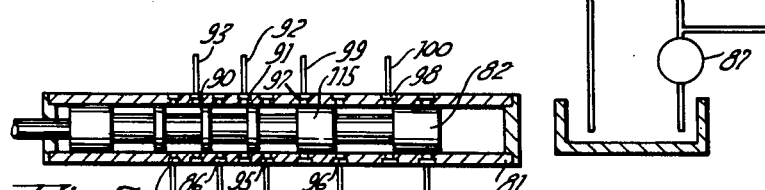
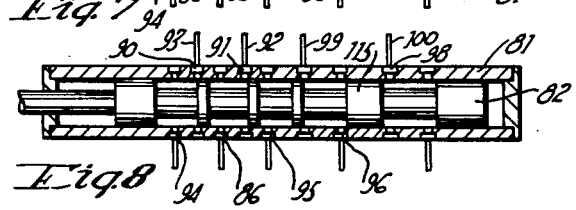
INVENTOR.
MILLARD ROMAINE
BY
A. H. K. Parsons
ATTORNEY.

Patented Dec. 22, 1936

2,065,101

UNITED STATES PATENT OFFICE 2,065,101

BROACHING MACHINE FIXTURE

Millard Romaine, Cincinnati, Ohio, assignor to The Cincinnati Milling Machine Co., Cincinnati, Ohio, a corporation of Ohio Application May 6, 1935, Serial No. 19,912

19 Claims. (Cl. 90—33)

This invention relates to broaching machines and more particularly to a fixture for receiving, transferring and clamping work in such machines.

One of the objects of this invention is to provide a work holder for broaching machines which may be conveniently utilized for receiving work from a table, conveyor or the like, in one plane, and transferring and clamping the work in a second plane for a subsequent machining operation thereon.

Another object of this invention is to provide a tilting work fixture for broaching machines which may be power oscillated from a work receiving position to a machining position, together with improved and simplified means for clamping the work in the fixture and for clamping the fixture in the machining position.

A further object of this invention is to provide improved means for automatically positioning longitudinal work pieces in which cross slots of variable angularity with respect to the longitudinal axis of the work are to be broached.

An additional object of this invention is to provide an improved control circuit for power oscillating and clamping a work fixture to cause operation of the parts in a predetermined sequence, together with suitable interlocks with the machine control to prevent starting of the machine until the work has been properly secured in a machining position.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a plan view of a fixture embodying the principles of this invention, the same being shown in a work receiving position.

Figure 2 is an elevation of the fixture shown in Figure 1, and partly in section and with the fixture swiveled to a machining position.

Figure 3 is a detail view of the work receiving platen.

Figure 4 is a detail section on the line 4—4 of Figure 3.

Figure 5 is an elevational view of the fixture as applied to a broaching machine, and as viewed from the right of Figure 2.

Figure 6 is a diagrammatic view of the operating control circuit of the fixture.

Figures 7 and 8 are detail views showing different positions of the main control valve.

In broaching machines, and especially those termed surface broaching machines, the work is often received at the machine with the surface, to be operated upon or finished, lying in a plane different from the plane of the surface broaching tool, thereby necessitating a transfer and manipulation of the work to move said surface out of a receiving plane and into a working or machining plane. In many cases this requires a lifting of the work which is very fatiguing to the operator. By means of the present invention this lifting is performed by power, the fixture being so constructed that the work is received and clamped therein while in the receiving plane and then the entire fixture is pivoted and locked by power in a machining position.

In the drawings the reference numeral 10 indicates generally the fixture which comprises a housing 11, having a pair of ears 12 projecting therefrom through which passes a shaft 13 and to which the housing is keyed for rotation with the shaft. As shown in Figure 5, the shaft in turn is supported in a pair of upwardly extending ears 14 and base member 15. This shaft also has a gear 16 keyed thereto, as more particularly shown in Figure 2, the gear intermeshing with rack teeth 17 formed on a piston rod 18 which has a piston 19, secured to one end and contained in a cylinder 20.

By alternately admitting pressure to opposite ends of the cylinder the gear 16 may be rotated or oscillated in opposite directions to raise and lower the fixture.

An adjustable stop 21 may be provided to determine the work receiving position of the fixture and insure alignment of the work receiving platen thereof with a source of supply such as a conveyor or a table 22.

The fixture 10 has a work receiving platen 23, which is shown in detail in Figure 3. This platen is cylindrical in shape and is rotatably supported in a bore 24 formed in the housing 11. The platen has a peripheral flange 25 which engages a shoulder 26 formed in the housing 11 and held in place therein by a ring 27, which is bolted or otherwise secured to the housing 11 and sufficiently wide to overlap the flange 25. The platen has a work receiving face 28 and the parts are so adjusted that this face will lie substantially in the plane of the table 22 so that the work may be easily slid from the table to the platen, or from the platen to the table.

This fixture is adapted to receive and hold rectangular work pieces in which a cross slot is to be broached, and the platen is rotatable so that this cross slot may be broached either at right angles to the longitudinal axis of the work piece, or at other angles different from a right angle. To this end the face 28 is provided with a pair of raised bosses 29 and 30 which have aligned side faces 31 and 32 which serve as a guide against which the work piece is held by a spring pressed plunger 33. This plunger, it will be noted, lies in a plane midway between the two bosses. This plunger has a lug 34 attached to the top thereof and riding in an elongated slot, the lug being of sufficient height to engage the edge of the work without interfering with the broaching tool during formation of the slot.

In addition, an end stop 35 is provided which also aids in determining the position of the slot longitudinally of the work piece. The stop 35 is angular in shape, as shown in Figure 3, and has a pair of elongated slots 36 formed in one leg thereof through which pass a pair of clamping bolts 37 by means of which the stop may be secured to the face 28.

An additional pair of bosses 38 and 39 are formed on the face 28 and these cooperate with the bosses 29 and 30 for supporting a pair of thrust plates 40 and 41 against which the work is clamped during the machining operation. The clamping means comprises an elongated member 42 which, as shown in Figure 3, is mounted in a rectangular opening 43 formed in the face 28 and the underside of this member has a square opening 44, as shown in Figure 2, in which fits the square end 45 of the screw 46.

The screw 46 is threaded in a nut member 47 which is journaled in the member 23, and this nut has a shoulder 48 on one end and a gear 49 attached to the other end which holds the nut member against axial movement. The gear 49 meshes with rack teeth 50 formed on a piston rod 51 which is integral with a piston 52 contained in a cylinder 53. By admitting pressure alternately to opposite ends of the cylinder 53 the nut may be rotated in opposite directions to effect axial movement of the screw 46. When the screw is moved toward the left, as viewed in Figure 2, a mushroom head 54 integral with the screw imparts a thrust to the clamping member 42 and frictionally holds the work between itself and the clamping plates 40 and 41.

A control valve 55 is attached to the housing member 11 as viewed in Figure 5, to which is connected a supply pipe 56 and a pair of delivery channels 57 and 58 which lead to opposite ends of the cylinder 53. The pipe 56 is a flexible pipe so that it may be connected to a suitable source of supply of operating fluid, such as compressed air or some form of liquid under pressure, and still permit oscillation of the fixture.

Since the member 23 is rotatable in the housing 11, and since the cylinder is fixed therewith, the channels 57 and 58 are also made flexible. The control valve 55 has an operating handle 59 which, it will be noted, from Figure 1, projects into the path of the operator as he moves from the loading position adjacent the end 60 of the table 22 to a second control lever 61, which controls the oscillation of the fixture. With the parts arranged in this manner it tends to insure that the operator will throw the lever 59 in a clockwise direction to clamp the work in the fixture before the same is swung to a machining position through operation of the lever 61.

It will be noted from Figure 5, that the rotatable platen 23 carries an index mark 62 which is adapted to cooperate with graduations 63 carried by the housing 11 whereby the angularity of the longitudinal axis of the work with respect to the vertical may be determined, which angle is also equal to the angularity or axis of the cross slot with respect to the horizontal. This adjustment is effected by loosening the clamp ring 27 and manually rotating a pinion 64 journaled on the housing 11 and intermeshing with a gear segment 65 carried by the member 23.

A stop block 66 is attached to the machine, as shown in Figures 1 and 2, for engagement with the plate 41 to limit the counterclockwise movement of the fixture and properly position the work and determine the depth of cut to be made by the reciprocating surface broaching tool 67, which is carried by a ram 68 slideable in guide ways 69 formed on the bed 70 of a broaching machine.

This ram may be reciprocated by suitable means, such as by a piston contained in the cylinder 71. A control lever 72 may be pivotally mounted on the top of the machine and suitably connected to valve mechanism not shown for controlling the admission of pressure to opposite ends of the cylinder 71 and these connections may be such that the lever 72 may have a central position in which the ram 68 is stopped, and operating positions on either side thereof for causing advance and return movement of the ram.

Mechanism has been provided for locking the fixture in the machining position and comprises a pair of hook-shaped lock arms 73, which are pivotally supported by a shaft 74 to which they are keyed, the shaft having an integral pinion 75 intermeshing with rack teeth 76 formed on a piston rod 77. This piston rod, as shown in Figure 6, has an integral piston 78 on one end slideably mounted in a cylinder 79. Upon admission of pressure to the left end of cylinder 79 the arms 73 are raised and upon admission of pressure to the opposite end of the cylinder the arms 73 are lowered into engagement with notches 80 formed on the top of the housing 11. As shown in Figure 6, a main control valve 81 is provided which controls the oscillation and clamping of the fixture. This valve has a reciprocable plunger 82, on the projecting stem 83 of which is formed rack teeth 84 intermeshing with the pinion 85, which is operatively connected to the operating lever 61.

The control valve has a pressure port 86 to which is connected a suitable pressure source, such as a pump 87. This pressure port is alternately connected by cannelures 88 and 89 to ports 90 and 91 from which run channels 92 and 93 to opposite ends of a cylinder 79. The valve also has a pair of exhaust ports 94 and 95 to which channels 92 and 93 are alternately connected whereby one end of the cylinder 79 may be connected to pressure and the other end connected to exhaust.

The valve 81 also has another pressure port 96 which is alternately connectible to ports 97 and 98 from which extend channels 99 and 100, which terminate in ports 101 and 102 of an interlock valve 103. This valve has a pair of ports 104 and 105, which are connected by channels 106 and 107 to opposite ends of cylinder 20.

Assuming the fixture 10 is in a work loading position the various control and operating parts would then assume the position shown in Figure 6, and in order to elevate the fixture to a working position the operator will move the control lever 61 to the left, as viewed in Figure 6. This would move the valve plunger 82 to the position shown in Figure 7 whereby the pressure port 86 would be connected to port 91 and fluid would be admitted to the left end of cylinder 79. The piston 78 would then move toward the right and cause counterclockwise rotation of gear 75 and movement of plunger 108 through intermeshing rack teeth 109 formed thereon to the left. This plunger has a lost motion connection at 110 with the plunger 111 of the interlock valve 103 so that the plunger 111 will not be shifted to the left until the final portion of the movement of piston 78.

When the plunger 111 is shifted to the left it will connect port 102 with port 104 and since channel 100 is now connected to pressure port 96, as shown in Figure 7, fluid will flow through channel 106 to the left end of cylinder 20, causing elevation of the fixture 10. As the piston 19 completes its movement a dog 112, carried by the piston rod 18, will engage a boss 113 formed on the lever 61 and shift the valve plunger 82 back to the position shown in Figure 6.

The exhaust fluid from cylinder 20 will pass through channel 107, port 105, cannelure 114, port 101, channel 99 to port 97, but since this port is closed by spool 115, the fluid will be forced through branch 116 of channel 107 and through the resistance 117 to the return line 18. The return fluid from cylinder 79 will pass through channel 93, port 90, cannelure 88 and exhaust port 94.

When the valve plunger 82 is returned to the central position shown in Figure 6 by the dog 112, the port 90 is reconnected to pressure port 86 and the piston 78 is moved toward the left, lowering the clamped arm 73 to a locking position and returning the interlock valve plunger 111 to the position shown in Figure 6, thereby disconnecting the pressure from cylinder 20.

From the foregoing it will be seen that after the operator moves the control lever 61 to the left that the following sequence of operations takes place:

The piston 78 moves toward the right, oscillating the clamped arm 73 in a counterclockwise direction, thereby shifting the interlock valve which, in turn, admits pressure to cylinder 20 causing elevation of the work fixture, and the final part of this movement shifts the main control valve back to a central position, which, in turn, causes return movement of piston 78, which results in lowering of the clamp arms to locking position and a return shifting of the interlock valve which finally cuts off the pressure to cylinder 20.

When the fixture 10 is to be returned to a loading position the operator moves the control lever 61 to the right as viewed in Figure 6, and the same sequence of operations takes place with the exception that the piston 19 is now moved toward the left due to the fact that the channel 99 is now connected to pressure instead of channel 100.

Assuming the control lever 72 is moved to the position indicated by the dash and dot line 119 to cause the broaching tool 67 to feed toward the right, as viewed in Figure 5, an interlock has been provided to prevent this movement until the fixture is clamped in its working position. To this end a bell crank 120 is pivotally mounted on a pin 121 and a spring 122 connected to one leg of the bell crank to normally move the same into the path of a lug 123 integral with the lever 72. The other leg of the bell crank engages a plunger 124 slideably in a cylinder 125, the end of the cylinder being connected by a channel 126 to port 127 of the interlock valve 103. It will be noted from Figure 6 that when the main control valve plunger 82 is in a central position that the channel 93 is under pressure and this channel has a branch 128 connected to port 129 of the interlock valve and the interlock valve plunger has a cannelure 130 which, when in the position shown, connects port 129 to port 127, thereby acting to rotate the bell crank in a counterclockwise direction to remove the arm 120 from the path of lug 123.

This hydraulic connection is, however, broken as soon as the fixture 10 begins to rise to a machining position and is not reconnected until it is finally clamped in such position, thereby preventing the operator from starting the broaching tool until the fixture is clamped in position.

If so desired, a thrust plate may be applied to the bed for absorbing the reaction of the broaching tool on the work which may be in the form of a fabricated structure comprising top and bottom supporting plates 131, 132 and an intermediate vertical thrust plate 133 placed edgewise to the direction of thrust and carrying a boss 134 which is engageable with a boss 135 on the fixture when it is swung into broaching position. This enables the thrust to be directly transmitted to the bed of the machine and prevents any twisting or misaligning of the fixture.

There has thus been provided an improved fixture for receiving and transferring work from one plane to another and which also serves to hold the work during the machining operation.

What is claimed is:

1. In a broaching machine having a reciprocable broaching tool, the combination of means for transferring work from a receiving plane into the plane of the broaching tool including a work fixture pivotally supported for swinging movement toward and from movement of the tool, guides in the fixture for positioning the work in a predetermined angular relation to the fixture, means to secure said guides in different angular positions and fluid operable means for swinging the fixture from the receiving plane into an operating plane.

2. In a work supporting fixture for a broaching machine having a slot broaching tool, the combination of an oscillatable housing movable between a loading position and an operating position, a work receiving platen mounted in said housing having guides thereon for determining the axial position of the work, means to rotate said platen to change the angle of the work axis with respect to the operating plane of the broaching tool, graduation marks associated with one of said elements and a reference mark associated with the other for indicating said angle.

3. In a work supporting fixture for a broaching machine having a slot broaching tool, the combination of an oscillatable housing movable between a loading position and an operating position, a work receiving platen mounted in said housing having guides thereon for determining the axial position of the work, means to rotate said platen to change the angle of the work axis with respect to the operating plane of the broaching tool, graduation marks associated with one of said elements, a reference mark associated with the other for indicating said angle, and means to clamp the platen to the housing after said adjustment.

4. The combination with a broaching machine having a broaching tool, of a tiltable work receiving fixture movable between a loading position and a machining position, means to clamp work in the fixture while in a loading position, a first fluid operable motor for swinging the fixture to a machining position, a second fluid operable motor, and means actuable thereby for securing the fixture in its machining position.

5. The combination with a broaching machine having a broaching tool, of an oscillatable work fixture movable between a loading position and a machining position, fluid operable means for effecting oscillation of said fixture, additional fluid operable means for clamping the fixture when in a machining position, and means for unclamping said fixture and returning the same to a loading position including delay means for preventing said return movement until the fixture has been unclamped.

6. In a work fixture for a broaching machine having a reciprocable broaching tool, the combination of a pivoted housing, a work receiving platen rotatably supported in the housing, said platen having a guide for determining the angular relationship of the work axis with respect to the axis of the broaching tool, means to rotatably adjust the platen to vary said angular relationship, and power operable means carried by the platen for clamping the work thereon regardless of its angular position.

7. In a work fixture for a broaching machine having a reciprocable broaching tool, the combination of a pivoted housing, a work receiving platen rotatably supported in the housing, said platen having a guide for determining the angular relationship of the work axis with respect to the axis of the broaching tool, means to rotatably adjust the platen to vary said angular relationship, power operable means carried by the platen for clamping the work thereon regardless of its angular position, and graduations associated with the platen for indicating the angle that said guide makes with the axis of the broaching tool.

8. In a fixture for a broaching machine having a reciprocable broaching tool, the combination of a pivoted housing, a work supporting platen in the housing having a rectilinear guide thereon, resiliently operable means for moving a work piece into engagement with said guide, means overlying the work and having a surface against which the work is to be clamped and a fluid operable plunger having means thereon for clamping the work against said surface while the work is held in engagement with the guide surface.

9. In a broaching machine having a reciprocable broaching tool, the combination of a fixture power movable to and fro between a broaching position and a loading position, a control lever for determining the direction of movement of the fixture, power operable means for clamping the work in the fixture including a control lever, said last-named lever projecting into the operator's path of movement from a fixture loading position to an operating position for the first-named control lever to thereby insure clamping of the work before the fixture is moved from a loading position.

10. In a broaching machine having a power reciprocable broach and a first control lever for determining movement of the broach, the combination of a fixture pivoted for movement to and fro between a broaching position and a loading position, power means for moving the fixture including a control lever, power operable means for clamping the work in the fixture while in a loading position including a control lever, said last-named lever being positioned to insure its operation by the machine attendant before the second-named control lever, and interlock means to prevent operation of the first-named lever until the fixture has been moved to a broaching position.

11. In a machine of the character described, the combination with a tool support of a work receiving fixture oscillatable from a loading to a tooling position, a power clamp for engagement with the fixture when in a tooling position, power means for effecting oscillation of the work carrier from loading to tooling positions, and coupled power means for effecting sequential releasing and clamping movements of the power work clamp during unidirectional oscillation of the work carrier.

12. In a machine of the character described, the combination with a tool support of a work receiving fixture oscillatable from a loading to a tooling position, a power clamp for engagement with the fixture when in a tooling position, power means for effecting oscillation of the work carrier from loading to tooling positions, coupled power means for effecting sequential releasing and clamping movements of the power work clamp during unidirectional oscillation of the work carrier, a tool controlling member, a lock-out device for preventing actuation of said member, and connections between the clamp operating means and said lockout for effecting joint actuation of said parts whereby actuation of the tool is prevented when the clamps are in released position.

13. In a machine of the character described, the combination with an oscillatable work holder and power operable clamp means for securing the work holder in one of its oscillated positions, of a plurality of hydraulic motors for controlling respectively the oscillation of the work holder and the engagement and disengagement of the clamps relative thereto, an hydraulic actuating system including a source of fluid under pressure and a plurality of serially arranged valves for determining the actuation of said motors, manually operable means for shifting one of said valves to initiate a cycle of movement of the motors, and mechanically operable devices for effecting subsequent movements of the valves in predetermined sequence and thereby sequential actuation of the motors to oscillate the work holder and subsequently clamp same in operative position.

14. In a machine of the character described, the combination with an oscillatable work holder and power operable clamp means for securing the work holder in one of its oscillated positions, of a plurality of hydraulic motors for controlling respectively the oscillation of the work holder and the engagement and disengagement of the clamps relative thereto, an hydraulic actuating system including a source of fluid under pressure and a plurality of serially arranged valves for determining the actuation of said motors, manually operable means for shifting one of said valves to initiate a cycle of movement of the motors, mechanically operable devices for effecting subsequent movements of the valves in predetermined sequence and thereby sequential actuation of the motors to oscillate the work holder and subsequently clamp same in operative position, a releasable interlock for control of tool actuation, an hydraulic actuator therefor, and means operatively coupling the hydraulic actuator with the source of fluid pressure in one position of adjustment of said serially arranged valves.

15. In a machine of the character decsribed, the combination with a support and a tool carried thereby, of means for controlling operative presentation of work to the tool, including a shiftable work support, means for clamping the work support in operative position, hydraulically actuable motors for effecting movement of the work support and the clamp, a source of hydraulic actuating fluid, and a plurality of valves for determining the effective coupling of the actuating fluid with the work support and work clamp motors, means for initiating a cycle of movement of the parts, means operable on shifting of the work clamp for adjusting one of said valves to determine the reactance of the hydraulic fluid on the work holder motor, and means operable by movement of the work holder for shifting another of said valves to effect the reactance of the hydraulic fluid on the work clamp substantially as and for the purpose described.

16. In a broaching machine, the combination with a supporting unit and a broaching ram reciprocably mounted thereon, of an oscillatable work support disposed adjacent the unit, means for effecting oscillation of the work support to effect shifting of a work piece supported thereby in juxtaposition to the broach ram, means carried by the ram supporting unit for securing the work in said juxtaposition relation for retaining the work in operative position against the broach thrust in a direction tending to separate the parts, and additional means carried by the broach supporting unit for preventing lateral displacement of the work during the broaching operation.

17. The combination with a broaching machine including a bed having a vertical broach bearing face and a broaching ram horizontally reciprocable on the bed having a broach bearing portion disposed adjacent said vertical face, of a work supporting member mounted adjacent the bed, means pivotally supporting the fixture for oscillation from a horizontal work receiving position to a vertical operative position in opposition to the vertical broach bearing face of the bed, and means carried by the bed and projecting beyond the vertical face thereof transversely of the plane of the broach for inter-engagement with the fixture to secure the fixture in rigid engagement with said vertical face of the broach whereby springing away of the work during the broaching operation is prevented.

18. The combination with a broaching machine including a bed having a vertical broach bearing face and a broaching ram horizontally reciprocable on the bed having a broach bearing portion disposed adjacent said vertical face, of a work supporting member mounted adjacent the bed, means pivotally supporting the fixture for oscillation from a horizontal work receiving position to a vertical operative position in opposition to the vertical broach bearing face of the bed, and means carried by the bed and projecting beyond the vertical face thereof transversely of the plane of the broach for inter-engagement with the fixture to secure the fixture in rigid engagement with said vertical face of the broach whereby springing away of the work during the broaching operation is prevented, and additional means carried by the bed and extending through the plane of the broach into lateral engagement with the fixture for preventing transverse shifting of the work relative to the bed during the broaching operation.

19. In a broaching machine of the character described including a bed having horizontal ways adjacent one face thereof and a broach carrying ram horizontally reciprocable along said ways, of a work carrier, a horizontally disposed pintle bearing for said work carrier, hydraulically operated means for effecting an oscillation of the carrier about its pivot to present a work piece to the vertical face of the bed in opposition to the broach, a first means carried by the bed for securing the work against movement in a direction away from the broach during the cutting operation and a second means carried by the bed for preventing movement of the work in the direction of longitudinal thrust of the broach during the broaching operation whereby displacement of the work relative the broach and its guiding bed during the broach operation is prevented.

MILLARD ROMAINE.

CERTIFICATE OF CORRECTION.

Patent No. 2,065,101. December 22, 193

MILLARD ROMAINE.

It is hereby certified that error appears in the printed specification of the above numbered patent requiring correction as follows: Page 3, second column, line 45, claim 1, strike out the words movement of; and that the said Letters Patent should be read with this correction therein that the same may conform to the record of the case in the Patent Office.

Signed and sealed this 2nd day of March, A. D. 1937.

(Seal)

Henry Van Arsdale
Acting Commissioner of Patents.